United States Patent
Smith et al.

(10) Patent No.: US 12,021,335 B2
(45) Date of Patent: Jun. 25, 2024

(54) ACTIVE COVER PLATES

(71) Applicant: SNAPRAYS, LLC, Vineyard, UT (US)

(72) Inventors: Jeremy C. Smith, Orem, UT (US); R. Camden Robinson, Lindon, UT (US); Chas Carter, Pleasant Grove, UT (US); Kendall H. Seymour, Pleasant Grove, UT (US)

(73) Assignee: SnapRays, LLC, Vineyard, UT (US)

( * ) Notice: Subject to any disclaimer, the term of this patent is extended or adjusted under 35 U.S.C. 154(b) by 318 days.

(21) Appl. No.: 17/385,841

(22) Filed: Jul. 26, 2021

(65) Prior Publication Data

US 2021/0359477 A1    Nov. 18, 2021

Related U.S. Application Data

(63) Continuation-in-part of application No. 16/166,965, filed on Oct. 22, 2018, now Pat. No. 11,158,982, which is a continuation-in-part of application No. 15/870,832, filed on Jan. 12, 2018, now Pat. No. 10,109,945.

(60) Provisional application No. 62/579,033, filed on Oct. 30, 2017, provisional application No. 62/536,452, filed on Jul. 24, 2017, provisional application No. 62/522,691, filed on Jun. 21, 2017, provisional application No. 62/460,094, filed on Feb. 17, 2017.

(51) Int. Cl.
| | | |
|---|---|---|
| H01R 24/68 | (2011.01) | |
| H01R 13/24 | (2006.01) | |
| H02G 3/14 | (2006.01) | |
| H01R 13/70 | (2006.01) | |
| H01R 25/00 | (2006.01) | |

(52) U.S. Cl.
CPC ............ *H01R 24/68* (2013.01); *H01R 13/24* (2013.01); *H02G 3/14* (2013.01); *H01R 13/701* (2013.01); *H01R 25/006* (2013.01)

(58) Field of Classification Search
None
See application file for complete search history.

(56) References Cited

U.S. PATENT DOCUMENTS

| | | | |
|---|---|---|---|
| 1,938,309 | A | 12/1933 | Williams |
| 2,015,698 | A | 10/1935 | Tiffany |
| 2,045,199 | A | 6/1936 | Petersen |
| 2,193,740 | A | 9/1938 | Reed |
| 2,134,695 | A | 11/1938 | Bigman |
| 2,227,549 | A | 1/1941 | McNeill |
| D141,030 | S | 4/1945 | Wheeler, Jr. |

(Continued)

FOREIGN PATENT DOCUMENTS

| | | |
|---|---|---|
| CA | 2732657 | 2/2011 |
| CN | 201311835 | 9/2009 |

(Continued)

OTHER PUBLICATIONS

Permaglo Night Light, www.costco.ca, accessed Mar. 21, 2017, pp. 1-4.

(Continued)

*Primary Examiner* — Krystal Robinson
(74) *Attorney, Agent, or Firm* — Young Basile Hanlon & MacFarlane, P.C.

(57) ABSTRACT

A variety of active cover plate configurations with prongs configured to contact side screw terminals of electrical receptacles are described.

20 Claims, 8 Drawing Sheets

(56) References Cited

U.S. PATENT DOCUMENTS

| | | | |
|---|---|---|---|
| 2,385,620 A | 9/1945 | Fleckenstein | |
| 2,428,167 A | 9/1947 | Linton | |
| 2,515,820 A | 7/1950 | Clark | |
| 2,542,609 A * | 2/1951 | Wyglendowski | H01R 24/28 |
| | | | 439/825 |
| 2,575,820 A | 11/1951 | Linton | |
| 2,580,056 A | 12/1951 | Wheeler, Jr. | |
| 2,749,381 A | 6/1956 | Farish, Jr. | |
| 2,880,285 A | 3/1959 | Robison et al. | |
| 2,908,743 A | 10/1959 | Premoshis | |
| 2,934,590 A | 4/1960 | Thompson et al. | |
| 2,942,227 A * | 6/1960 | Hjelseth, Jr. | G04C 10/00 |
| | | | 439/351 |
| 3,120,414 A | 2/1964 | Farish, Jr. | |
| 3,168,612 A | 2/1965 | Sorenson | |
| 3,307,030 A | 2/1967 | Francisco | |
| D212,760 S | 11/1968 | Bordner | |
| 3,522,595 A | 8/1970 | White | |
| 3,588,489 A | 6/1971 | Gaines | |
| 3,666,879 A * | 5/1972 | Hirsch | H01B 7/14 |
| | | | 174/128.1 |
| 3,680,237 A | 8/1972 | Finnerty, Sr. | |
| 3,739,226 A | 6/1973 | Seiter et al. | |
| 3,745,664 A * | 7/1973 | Altseimer | H02G 3/14 |
| | | | D10/64 |
| D230,274 S | 2/1974 | Pulos | |
| 3,859,454 A | 1/1975 | Mann | |
| 3,879,101 A | 4/1975 | McKissic | |
| 3,895,225 A | 7/1975 | Prior | |
| 4,000,405 A | 12/1976 | Horwinski | |
| 4,038,582 A | 7/1977 | Horwinski | |
| 4,117,258 A | 9/1978 | Shanker | |
| 4,255,780 A | 3/1981 | Sakellaris | |
| 4,282,591 A | 8/1981 | Andreuccetti | |
| 4,494,815 A | 1/1985 | Brzostek et al. | |
| 4,514,789 A | 4/1985 | Jester | |
| 4,534,486 A * | 8/1985 | Eidson | H02G 3/14 |
| | | | 220/241 |
| 4,546,419 A | 10/1985 | Johnson | |
| 4,611,264 A | 9/1986 | Bradley | |
| 4,616,285 A | 10/1986 | Sackett | |
| 4,617,613 A | 10/1986 | Rice | |
| 4,755,913 A | 7/1988 | Sleveland | |
| 4,774,641 A | 9/1988 | Rice | |
| 4,801,271 A | 1/1989 | Piper | |
| 4,952,755 A | 8/1990 | Engel et al. | |
| 4,970,349 A | 11/1990 | Jones | |
| 5,009,618 A | 4/1991 | Black et al. | |
| 5,016,398 A | 5/1991 | Fukunaga | |
| 5,069,526 A * | 12/1991 | Oestreich | G02B 6/4416 |
| | | | 385/101 |
| 5,087,796 A | 2/1992 | Norman | |
| 5,096,439 A | 3/1992 | Arnett | |
| D330,267 S | 10/1992 | Hendrix | |
| 5,153,816 A | 10/1992 | Griffin | |
| 5,186,682 A | 2/1993 | Iida | |
| 5,248,919 A | 9/1993 | Hanna | |
| 5,290,175 A | 3/1994 | Robinson | |
| 5,384,428 A | 1/1995 | Luu | |
| 5,406,439 A | 4/1995 | Crane et al. | |
| 5,473,517 A | 12/1995 | Blackman | |
| 5,477,010 A | 12/1995 | Buckshaw et al. | |
| D366,339 S | 1/1996 | Waller | |
| 5,481,442 A | 1/1996 | Dickie et al. | |
| 5,485,356 A | 1/1996 | Nguyen | |
| 5,526,952 A * | 6/1996 | Green | H02G 3/14 |
| | | | 220/241 |
| 5,584,725 A | 12/1996 | Tseng | |
| 5,622,424 A | 4/1997 | Brady | |
| 5,660,459 A | 8/1997 | Appelberg | |
| 5,670,776 A | 9/1997 | Rothbaum | |
| 5,683,166 A | 11/1997 | Lutzker | |
| 5,703,329 A * | 12/1997 | Delone | H01R 13/447 |
| | | | 174/67 |
| D395,314 S | 6/1998 | Oikawa | |
| D399,825 S | 10/1998 | Heung et al. | |
| 5,816,682 A | 10/1998 | Marischen | |
| D401,566 S | 11/1998 | Gesmondi | |
| 5,833,350 A | 11/1998 | Moreland | |
| D407,072 S | 3/1999 | Gaule | |
| 5,914,826 A | 6/1999 | Smallwood | |
| 5,998,735 A | 12/1999 | Patterson, Jr. | |
| 6,000,807 A | 12/1999 | Moreland | |
| 6,010,228 A | 1/2000 | Blackman | |
| 6,023,021 A | 2/2000 | Matthews et al. | |
| D427,086 S | 6/2000 | Gaule | |
| 6,087,588 A | 7/2000 | Soules | |
| 6,089,893 A | 7/2000 | Yu et al. | |
| D429,829 S | 8/2000 | Doran | |
| 6,103,974 A * | 8/2000 | Erdfarb | B05B 12/20 |
| | | | 174/67 |
| D443,500 S | 6/2001 | Luu | |
| 6,310,291 B1 | 10/2001 | Clough | |
| 6,341,981 B1 | 1/2002 | Gorman | |
| D456,239 S | 4/2002 | Luu | |
| 6,390,647 B1 | 5/2002 | Shaeffer | |
| 6,395,981 B1 | 5/2002 | Ford et al. | |
| 6,423,900 B1 | 7/2002 | Soules | |
| D464,865 S | 10/2002 | Luu | |
| 6,457,843 B1 | 10/2002 | Kester et al. | |
| D473,528 S | 4/2003 | Wengrower | |
| 6,547,411 B1 | 4/2003 | Dornbusch | |
| 6,608,253 B1 | 8/2003 | Rintz | |
| 6,648,496 B1 | 11/2003 | Elghoroury et al. | |
| 6,765,149 B1 | 7/2004 | Ku | |
| 6,774,328 B2 | 8/2004 | Adams et al. | |
| 6,805,469 B1 | 10/2004 | Barton | |
| 6,808,283 B2 | 10/2004 | Tsao | |
| D500,743 S | 1/2005 | Savicki, Jr. et al. | |
| 6,867,370 B2 | 3/2005 | Compagnone | |
| 6,883,927 B2 | 4/2005 | Cunningham et al. | |
| 6,891,284 B2 | 5/2005 | Tilley | |
| 6,895,177 B2 | 5/2005 | He et al. | |
| 6,974,910 B2 | 12/2005 | Rohmer | |
| 7,011,422 B2 | 3/2006 | Robertson et al. | |
| 7,019,212 B1 | 3/2006 | Esmailzadeh | |
| 7,036,948 B1 | 5/2006 | Wyatt | |
| 7,064,498 B2 | 6/2006 | Dowling et al. | |
| D542,627 S | 5/2007 | Rohmer et al. | |
| 7,247,793 B2 | 7/2007 | Hinkson et al. | |
| 7,270,436 B2 | 9/2007 | Jasper | |
| 7,273,983 B1 | 9/2007 | Rintz | |
| 7,318,653 B2 | 1/2008 | Chien | |
| 7,321,348 B2 | 1/2008 | Cok et al. | |
| D561,558 S | 2/2008 | Jackson | |
| D561,559 S | 2/2008 | Krumpe | |
| D567,633 S | 4/2008 | Anderson | |
| 7,360,912 B1 | 4/2008 | Savicki, Jr. | |
| D573,005 S | 7/2008 | Huang | |
| D576,566 S | 9/2008 | Wu et al. | |
| D577,985 S | 10/2008 | Kidman | |
| 7,480,123 B2 | 1/2009 | Jones | |
| 7,506,990 B2 | 3/2009 | Glazner | |
| 7,511,231 B2 | 3/2009 | Drane et al. | |
| 7,547,131 B2 | 6/2009 | Faunce | |
| 7,549,785 B2 | 6/2009 | Faunce | |
| 7,576,285 B1 | 8/2009 | Savicki, Jr. | |
| D603,984 S | 11/2009 | Richter | |
| D606,029 S | 12/2009 | Chou | |
| 7,674,976 B2 | 3/2010 | Eastin | |
| 7,745,750 B2 | 6/2010 | Hewson et al. | |
| 7,821,160 B1 | 10/2010 | Roosli et al. | |
| 7,850,322 B2 | 12/2010 | Glazner et al. | |
| 7,918,667 B1 | 4/2011 | Shim | |
| 7,946,871 B1 | 5/2011 | Yu et al. | |
| 8,003,886 B1 | 8/2011 | Rintz | |
| 8,063,303 B1 | 11/2011 | McBain | |
| D650,112 S | 12/2011 | Bryant | |
| 8,148,637 B2 | 4/2012 | Davidson | |
| 8,158,885 B2 | 4/2012 | Eastin | |
| 8,175,533 B2 | 5/2012 | Schubert | |
| D666,471 S | 9/2012 | Peckham | |
| 8,304,652 B2 | 11/2012 | McBain | |

(56) References Cited

U.S. PATENT DOCUMENTS

| | | | |
|---|---|---|---|
| 8,393,747 B2 | 3/2013 | Kevelos et al. | |
| 8,467,734 B2 | 6/2013 | Schubert | |
| 8,511,866 B1 | 8/2013 | Mendez | |
| 8,558,710 B1 | 10/2013 | Nitz | |
| 8,564,279 B2 | 10/2013 | Johnson et al. | |
| 8,629,617 B2 | 1/2014 | Richards et al. | |
| 8,638,085 B2 | 1/2014 | Hilton et al. | |
| 8,668,347 B2 | 3/2014 | Ebeling | |
| 8,697,991 B2 | 4/2014 | Davidson | |
| 8,770,424 B1 | 7/2014 | Shaw et al. | |
| 8,797,723 B2 | 8/2014 | Hilton et al. | |
| D719,699 S | 12/2014 | Bryant | |
| 8,912,442 B2 | 12/2014 | Smith | |
| D721,043 S | 1/2015 | Tonnesen | |
| 9,035,180 B2 | 5/2015 | Smith et al. | |
| 9,035,181 B2 | 5/2015 | Smith et al. | |
| 9,362,728 B2 | 6/2016 | Smith et al. | |
| 9,464,795 B2 | 10/2016 | Ebeling | |
| 9,482,426 B2 | 11/2016 | Diotte | |
| 9,575,587 B2 | 2/2017 | O'Keeffe | |
| 9,742,111 B2 | 8/2017 | Smith et al. | |
| 9,755,374 B2 | 9/2017 | St. Laurent et al. | |
| 9,768,562 B2 | 9/2017 | Smith et al. | |
| 9,774,154 B2 | 9/2017 | St. Laurent et al. | |
| 9,807,829 B2 | 10/2017 | Jensen | |
| 9,832,841 B2 | 11/2017 | Knight et al. | |
| 9,843,144 B2 | 12/2017 | Mortun et al. | |
| 9,871,324 B2 | 1/2018 | Smith et al. | |
| 9,882,318 B2 | 1/2018 | Smith et al. | |
| 9,882,361 B2 | 1/2018 | Smith et al. | |
| 9,899,814 B2 | 2/2018 | Smith et al. | |
| 9,917,430 B2 | 3/2018 | Smith et al. | |
| 9,970,641 B2 | 5/2018 | Mousavi | |
| D819,426 S | 6/2018 | Smith et al. | |
| 9,997,860 B1 | 6/2018 | Hernandez, Jr. | |
| 10,109,945 B2 | 10/2018 | Smith et al. | |
| 10,136,534 B2 | 11/2018 | Ebeling | |
| 10,373,773 B2 | 8/2019 | Smith et al. | |
| 10,381,788 B2 | 8/2019 | Smith et al. | |
| 10,381,789 B2 | 8/2019 | Smith et al. | |
| 10,506,316 B2 | 12/2019 | Ebeling et al. | |
| 10,586,666 B2 | 3/2020 | Bailey et al. | |
| 10,630,031 B1 | 4/2020 | Baldwin | |
| 10,667,347 B2 | 5/2020 | Fadell et al. | |
| 10,720,727 B1 | 7/2020 | Shotey et al. | |
| 11,158,982 B2 | 10/2021 | Smith | |
| 11,394,157 B2* | 7/2022 | Smith | H05K 5/03 |
| 2001/0046130 A1 | 11/2001 | Cunningham et al. | |
| 2002/0131262 A1 | 9/2002 | Amburgey | |
| 2003/0013503 A1 | 1/2003 | Menard et al. | |
| 2003/0124022 A1 | 7/2003 | Georges et al. | |
| 2004/0247300 A1 | 12/2004 | He et al. | |
| 2005/0264383 A1 | 12/2005 | Zhang | |
| 2006/0065510 A1 | 3/2006 | Kiko et al. | |
| 2006/0072302 A1 | 4/2006 | Chien | |
| 2006/0077684 A1 | 4/2006 | Yuen | |
| 2006/0161270 A1 | 7/2006 | Luskin et al. | |
| 2006/0170380 A1 | 8/2006 | Evans | |
| 2006/0262462 A1 | 11/2006 | Barton | |
| 2007/0120978 A1 | 5/2007 | Jones | |
| 2007/0206375 A1 | 9/2007 | Piepgras et al. | |
| 2008/0073117 A1 | 3/2008 | Misener | |
| 2008/0233780 A1 | 9/2008 | Waters et al. | |
| 2008/0266121 A1 | 10/2008 | Ellul | |
| 2009/0153438 A1 | 6/2009 | Miller et al. | |
| 2009/0225480 A1 | 9/2009 | Baxter | |
| 2009/0284385 A1 | 11/2009 | Tang et al. | |
| 2009/0305578 A1* | 12/2009 | Lim | H01R 13/40 |
| | | | 439/736 |
| 2009/0322159 A1 | 12/2009 | Dubose et al. | |
| 2010/0033950 A1 | 2/2010 | Farrell | |
| 2011/0056720 A1 | 3/2011 | Davidson | |
| 2011/0082599 A1 | 4/2011 | Shinde et al. | |
| 2011/0210833 A1 | 9/2011 | McNeely et al. | |
| 2011/0228552 A1 | 9/2011 | Kevelos et al. | |
| 2012/0008307 A1 | 1/2012 | Delany | |
| 2012/0013257 A1 | 1/2012 | Sibert | |
| 2012/0068612 A1 | 3/2012 | Ebeling | |
| 2012/0156937 A1 | 6/2012 | Almouli | |
| 2012/0182172 A1 | 7/2012 | Sorensen | |
| 2012/0215470 A1 | 8/2012 | Maguire | |
| 2012/0316808 A1 | 12/2012 | Frader-Thompson et al. | |
| 2013/0043978 A1 | 2/2013 | Brooks | |
| 2013/0063848 A1 | 3/2013 | Thorpe et al. | |
| 2013/0076242 A1 | 3/2013 | Moreland | |
| 2013/0221868 A1 | 8/2013 | Diotte | |
| 2013/0240470 A1 | 9/2013 | Huang | |
| 2015/0075836 A1* | 3/2015 | Smith | H02G 3/14 |
| | | | 174/66 |
| 2015/0371534 A1 | 12/2015 | Dimberg et al. | |
| 2017/0018890 A1 | 1/2017 | St. Laurent | |
| 2017/0018897 A1 | 1/2017 | St. Laurent | |
| 2017/0214188 A1 | 7/2017 | Smith | |
| 2018/0048099 A1 | 2/2018 | Diotte | |
| 2019/0090372 A1 | 3/2019 | Ebeling | |
| 2019/0122832 A1 | 4/2019 | Smith | |
| 2019/0195445 A1 | 6/2019 | Chien | |
| 2020/0154186 A1 | 5/2020 | Ebeling et al. | |

FOREIGN PATENT DOCUMENTS

| | | |
|---|---|---|
| DE | 202006006354 | 10/2007 |
| EP | 2211210 | 7/2010 |
| KR | 1019930025223 | 6/1995 |
| KR | 1019950015932 | 6/1995 |
| KR | 1020090098056 | 9/2009 |
| KR | 1020080047328 | 11/2009 |
| KR | 1020090121424 | 11/2009 |
| KR | 100955064 | 4/2010 |
| WO | 2007122141 | 11/2007 |
| WO | 2012006812 | 1/2012 |
| WO | 2012033746 | 3/2012 |
| WO | 2013019394 | 2/2013 |
| WO | 2014070863 | 5/2014 |

OTHER PUBLICATIONS

PermaGLO Safety Lighting Products, www.permaglo.com, accessed Mar. 21, 2017, 1 page.
Request for Ex Parte Reexamination for U.S. Pat. No. 9,035,180, dated May 19, 2015.
TekSkCo Technical Systems Company—Plug into The Future, at least as early as Jul. 16, 2009.
Request for Ex Parte Reexamination for U.S. Pat. No. 8,912,442, May 19, 2015.
Ontel answer and Affirmative Defenses to Plaintiff's Second Amended Complaint, U.S. District Court filing, Jun. 5, 2017.
Ontel Defendants LPR 2.2(b) Initial Disclosures, U.S. District Court filing, Jul. 14, 2017.
Ontel Defendants LPR 2.4 Preliminary Non-Infringement and Invalidity Contentions, Aug. 8, 2017.
Ontel Defendants Memorandum in Opposition to Plaintiff's Motion for Leave to File a Second Amended Complaint, U.S. District Court filing, Apr. 11, 2017.
U.S. Appl. No. 61/380,561 made publicly accessible with U.S. Patent Application Publication No. 2013/0221868 on Aug. 29, 2013, pp. 1-19.
Office Action dated Jan. 26, 2018 for Re-exam U.S. Appl. No. 90/014,022.
Office Action dated Feb. 23, 2018 for Re-exam U.S. Appl. No. 90/014,022.
Office Action dated Sep. 20, 2018 for U.S. Appl. No. 15/920,047.
Initial Expert Report of Michael Thuma.
UL warns of night light with unauthorized UL Mark, Product Safety Alert, Jul. 13, 2009, pp. 1-2, Electrical Safety Authority.
Plate Pals Wallplate Thermometers, http://www.platepals.com/home.html. Last visited Apr. 12, 2017. ,2006.
Respondent Alltrade Tools LLC's Notice of Prior Art.
Respondent Alltrade Tools LLC's Second Supplemental Invalidity Contentions.

(56) References Cited

OTHER PUBLICATIONS

Respondent Alltrade Tools LLC's Supplemental Invalidity Contentions.
Respondent Enstant Technology Co., Ltd,'s Response to Compainant Snaprays, LLC's Invalidity Contentions Interrogatories.
Respondent Ontel Products Corporation's Notice of Prior Art.
Respondent Enstant Technology Co., Ltd. and Vistek Technology Co., Lts.'s Notice of Prior Art.
International Search Report for PCT/US2011/050524, pp. 1-3, dated Mar. 28, 2012.
Written Opinion of the International Searching Authority for PCT/US2011/050524, pp. 1-3, dated Mar. 26, 2012.
International Preliminary Report on Patentability for PCT/US2011/050524, pp. 1-4, dated Mar. 13, 2013.
Written Opinion of the International Searching Authority for PCT/US2020/045678, pp. 1-5, dated Apr. 29, 2021.

\* cited by examiner

ACTIVE COVER PLATES

RELATED APPLICATIONS

The present application is a continuation-in-part of U.S. patent application Ser. No. 16/166,965 filed Oct. 22, 2018, which (1) claims the benefit of U.S. Provisional Patent Application Ser. No. 62/579,033 filed Oct. 30, 2017 and (2) is a continuation-in-part of U.S. patent application Ser. No. 15/870,832 filed Jan. 12, 2018 (now U.S. Pat. No. 10,109,945), which claims the benefit of U.S. Provisional Application Ser. No. 62/536,452 filed Jul. 24, 2017, U.S. Provisional Application Ser. No. 62/522,691 filed Jun. 21, 2017, and U.S. Provisional Application Ser. No. 62/460,094 filed Feb. 17, 2017.

U.S. patent application Ser. No. 16/166,965, U.S. Provisional Patent Application Ser. No. 62/579,033, U.S. patent application Ser. No. 15/870,832, U.S. Provisional Application Ser. No. 62/536,452, U.S. Provisional Application Ser. No. 62/522,691, and U.S. Provisional Application Ser. No. 62/460,094 are each hereby incorporated by reference.

BACKGROUND

Modern buildings include wiring to deliver electrical power to lights, outlets, and other devices. The electrical wiring typically terminates in an electrical box in a wall, ceiling, or floor or the box may be connected to another structural element. Connections are made to the wiring in the electrical box. For example, electrical wiring may be connected to outlets and switches by stab-in connectors or with screw terminals on the sides of the outlet/switch body. After installation, a wall plate is placed over the outlet/switch body to cover the opening to the box while allowing access to the outlet receptacles and/or access to manually manipulate the switch(es).

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Reference will now be made to the figures wherein like structures will be provided with like reference designations. In the following description, for purposes of explanation, numerous specific details are set forth in order to provide a thorough understanding of the present systems and methods. It will be apparent, however, that systems and methods may be practiced without these specific details. It is understood that the figures are diagrammatic and schematic representations of some embodiments of the invention, and are not limiting of the present invention, nor are they necessarily drawn to scale. Reference in the specification to "an example," "in selected embodiments," "in certain embodiments," or similar language means that a particular feature, structure, or characteristic described in connection with the example or embodiment is included in at least that one example or embodiment, but not necessarily in other examples or embodiments. Additionally, features shown and/or described in connection with one figure or embodiment may be combined with features shown and/or described in connection with other figures or embodiments.

Figure 1:
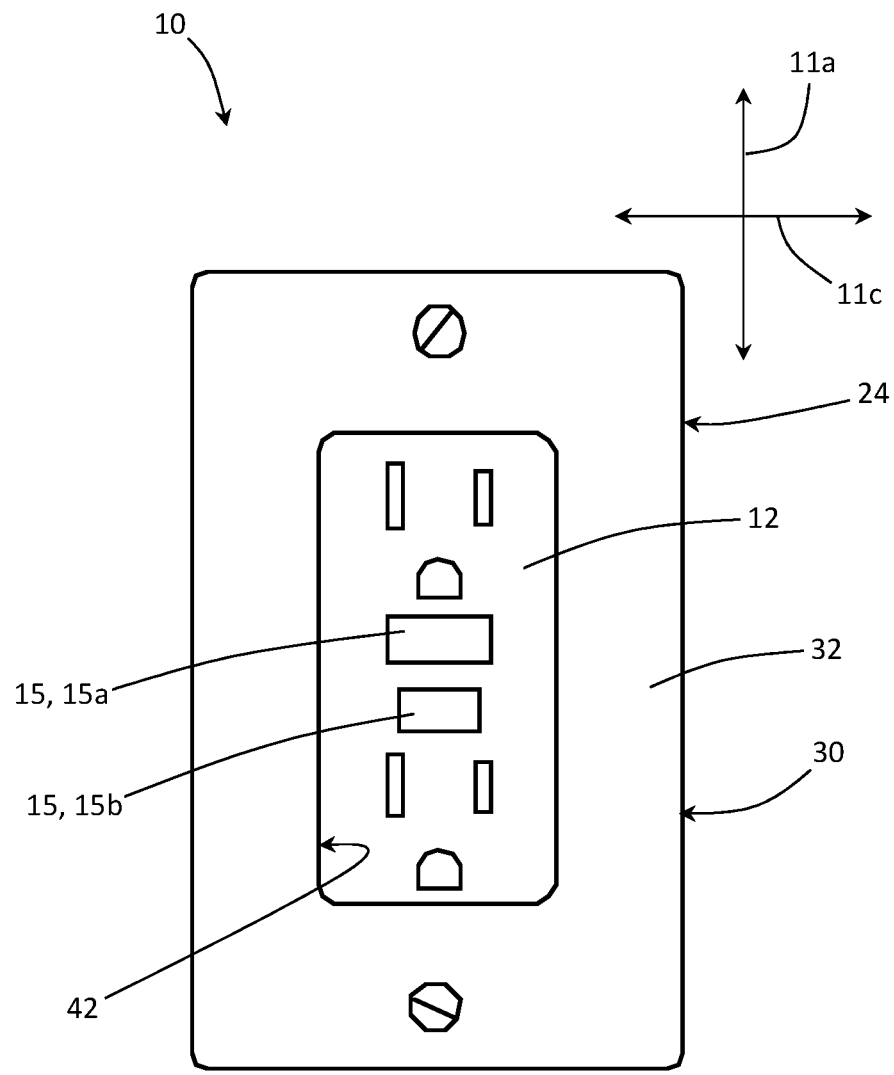
FIG. 1 is a front view showing an active cover plate installed on a GFCI outlet according to one example of principles described herein.
Figure 2:
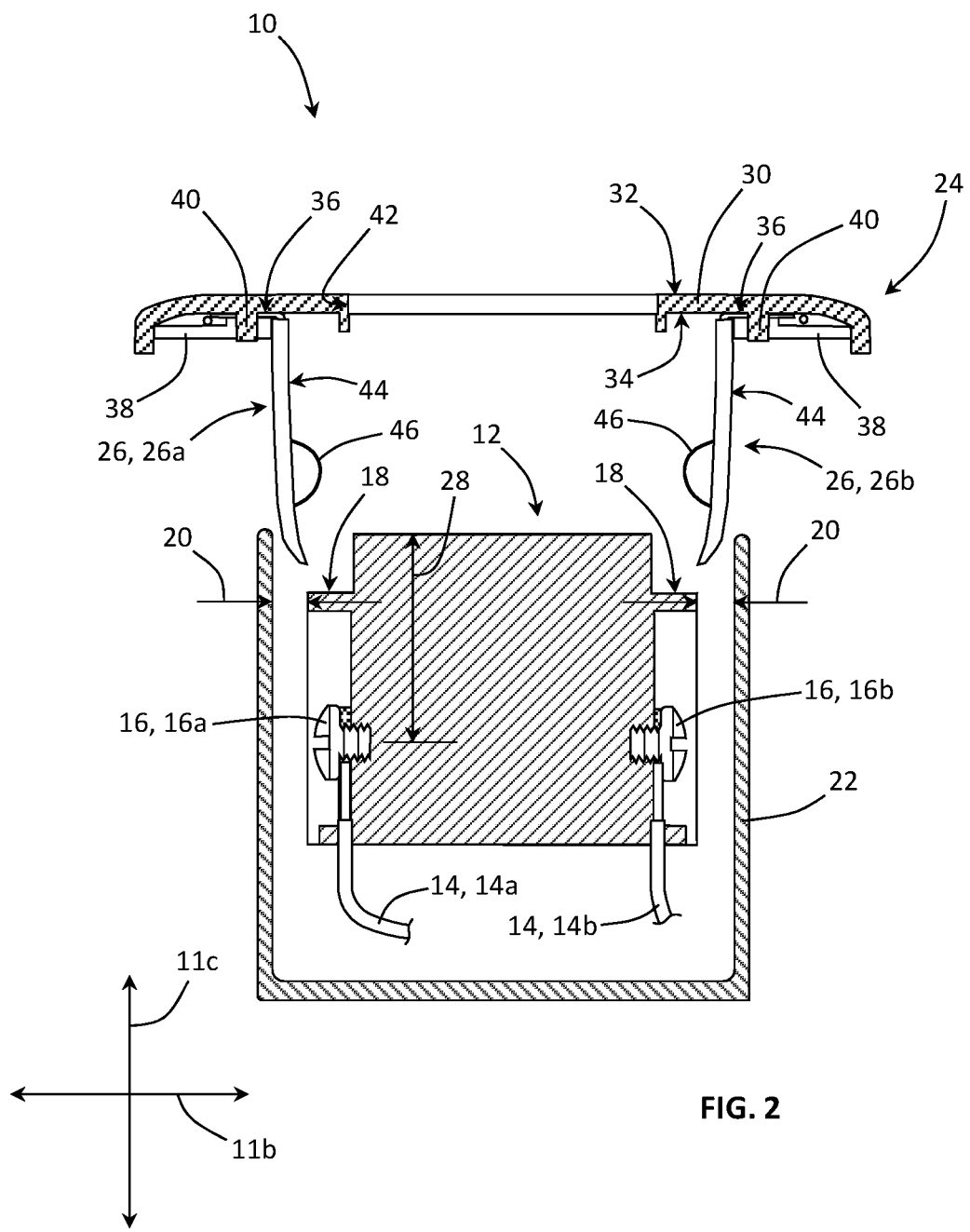
FIG. 2 is a cross-sectional diagram showing an active cover plate being installed on a GFCI outlet according to one example of principles described herein.
Figure 3:
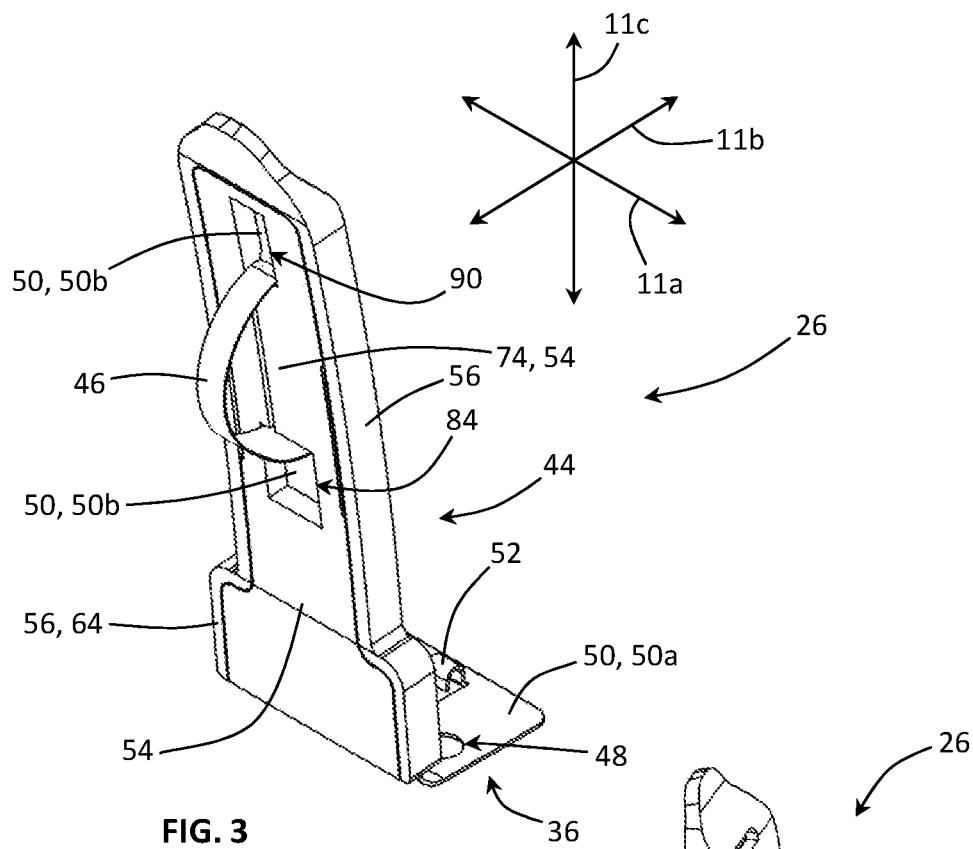
FIG. 3 is a perspective view of one embodiment of a prong of an active cover plate according to one example of principles described herein.
Figure 4:
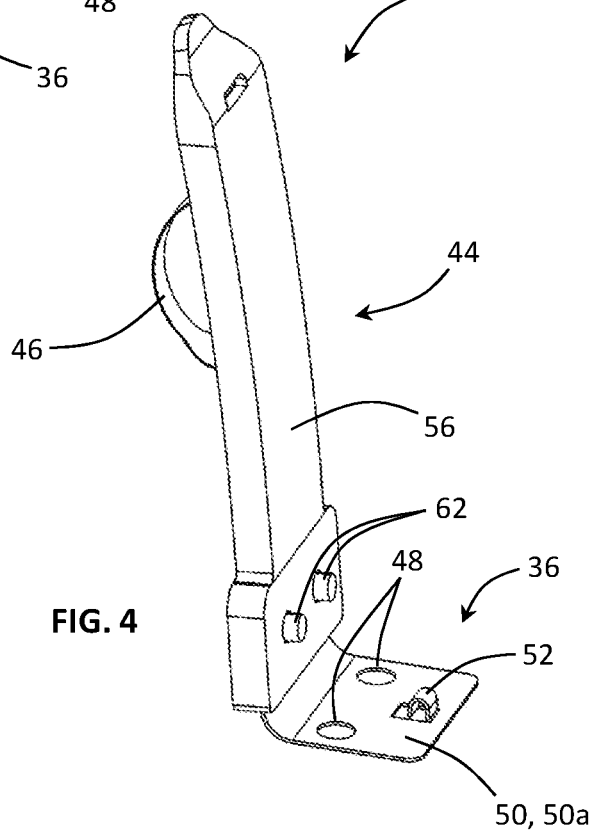
FIG. 4 is another perspective view of the prong of FIG. 3.
Figures 5, 6:
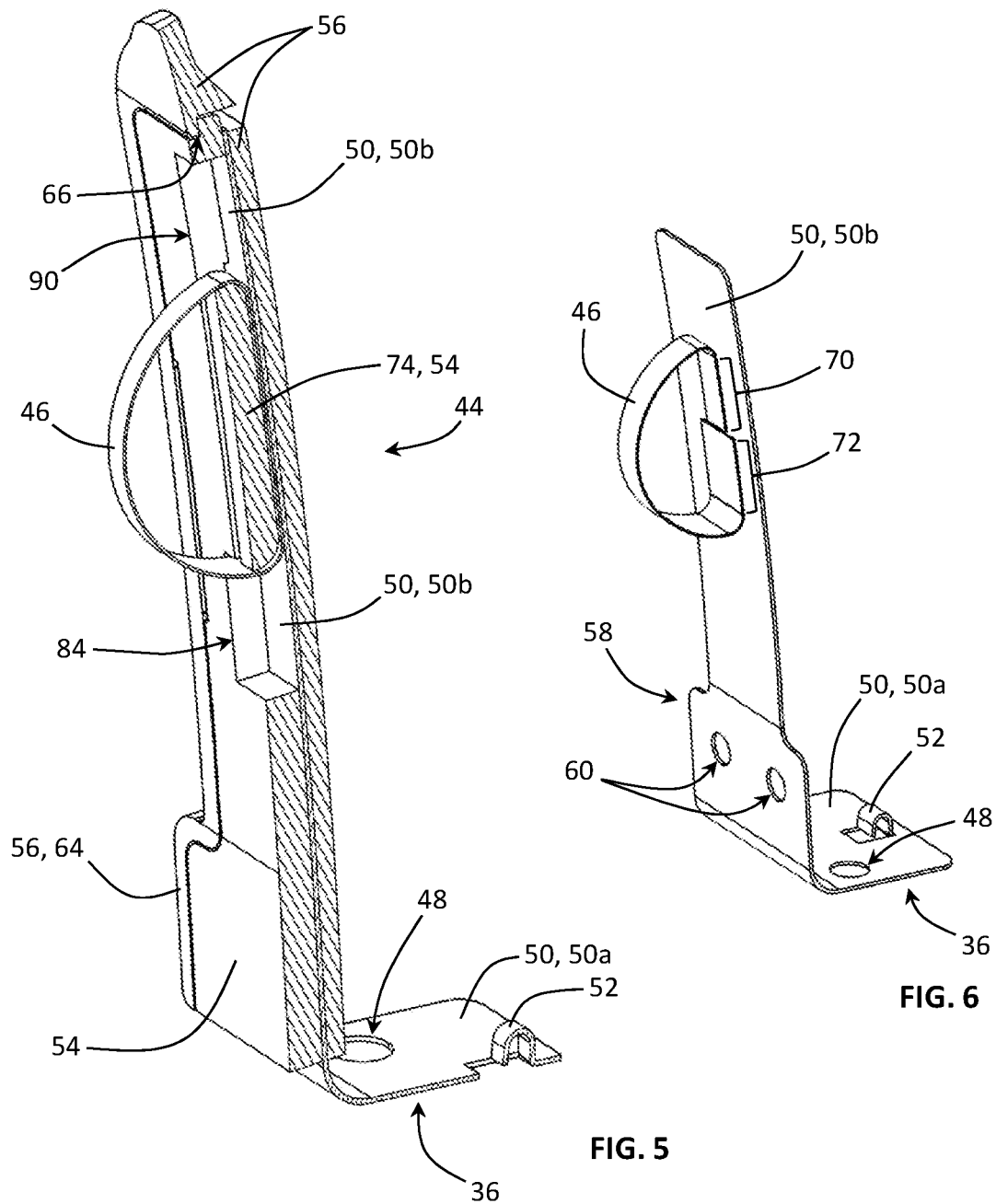
FIG. 5 is a perspective, side, cross-sectional view of the prong of FIG. 3.
FIG. 6 is a perspective view of a conductive portion and resilient contact of the prong of FIG. 3.
Figure 7:
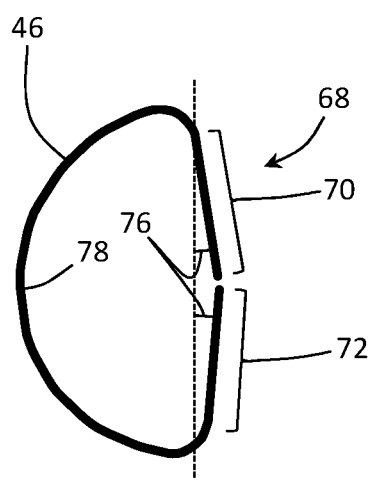
FIG. 7 is a side view of a resilient contact in a neutral or undeflected position.

Referring to FIGS. 1 and 2, a system 10 may extend in and/or define selected axes or directions. For example, a system 10 may extend in and define a longitudinal direction 11a, a lateral direction 11b, and a transverse direction 11c that are mutually orthogonal to one another.

In selected embodiments, a system 10 may include a ground fault circuit interrupter (GFCI) outlet 12. GFCI outlets 12 may also be known as "residual current devices" or ground fault interrupters "GFI" and more sophisticated versions thereof may include or be referred to as arc fault circuit interrupters (e.g., "AFCI," "AFCI/GFCI," or "AF/GF" outlets or the like). GFCI outlets 12 may be designed to quickly and automatically disconnect a circuit when they detect that the electric current is not balanced between the energized (line) conductor(s) 14a and the return (neutral) conductor 14b. Under normal circumstances, these two wires 14 are expected to carry matching currents and any difference may indicate that a short circuit or other electrical anomaly is present (e.g., leakage).

Leakage may indicate a shock hazard (or shock in progress) which is a potential danger to a person. Current leakage may result in harm or death due to electric shock, especially if the leaking electric current passes through the torso of a human. A current of around 30 mA (0.030 amperes) may be sufficient to cause cardiac arrest or serious harm if it persists for more than a fraction of a second. GFCI outlets 12 are designed to disconnect the conducting wires 14 quickly enough to prevent serious injury from such shocks.

Buttons 15 on a face of a GFCI outlet 12 may be "test" and "reset" buttons. A test button 15a may cause a small amount of power to be sent to ground or a neutral wire 14b, simulating a short. When a test button 15a is depressed, a GFCI outlet 12 should disconnect ("trip") and power to the outlet 12 should be disconnected. After a trip event, a "reset" button 15b may be depressed to reset the GFCI outlet 12 configuration and reenergize the outlet 12.

There may be a variety of different configurations of the electrical terminals 16 or screw terminals 16 and geometry of a GFCI outlet 12. For example, the hot and neutral terminals 16 may be on opposite sides of a GFCI outlet 12. Additionally, there may be load terminals 16 that are connected to outlets "downstream" or "daisy chained" from the GFCI outlet 12. These downstream outlets may also be benefited by the GFCI protection.

GFCI outlets 12 may be wider (e.g., have wider shoulders 18) than standard outlets because of the additional circuitry and electrical components that they contain. Consequently, there may be a relatively small gap 20 between the sides of a GFCI outlet 12 and the sides of an electrical or receptacle box 22 in which the GFCI outlet 12 is installed. This may have significant consequences for active cover plates 24 that use prongs 26 to contact terminals 16 of GFCI outlets 12. That is, the prongs 26 may be required to fit in the gap 20 between a GFCI outlet 12 and a box 22 in order to reach the terminals 16 on the sides of the GFCI outlet 12. The smaller the gap 20, the thinner the prongs 26 may be required to be.

Additionally, the terminals 16 of certain GFCI outlets 12 may not be located in the same position as a standard outlet. For example, the terminals 16 may be farther back and recessed into the body of the GFCI outlet 12 (i.e., there may be a greater distance 28 between the front of the outlet 12 and the terminals 16). Presumably designers recessed the terminals 16 to allow wires 14 to make connections without causing the width of the GFCI outlet 12 to increase beyond its already significant size.

GFCI outlets 12 may include four terminals 16 (e.g., four screw terminals 16), two on each side. A first set of opposing terminals 16 may be designated as "line" terminals. The wiring 14 that supplies power to the GFCI outlet 12 may be connected there, with the hot line connected to one terminal 16a and the neutral line connected to the other terminal 16b.

A second set of opposing terminals 16 may also be located on the body of a GFCI outlet 12. This other set of terminals 16 may be designated as the "load" terminals 16. These load terminals 16 may not be used when the GFCI outlet 12 is used by itself. However, additional outlets may be connected (e.g., "daisy chained") to the GFCI outlet 12 using the load terminals 16. These additional "daisy chained" outlets may be standard outlets, but because they are connected to power through a GFCI outlet 12, they may also be protected from ground faults by the GFCI outlet 12.

In selected embodiments, an active cover plate 24 designed for GFCI outlets 12 may be connected to either the line or load terminals 16. If the active cover plate 24 is connected to the line terminals 16, it may be powered regardless of the operation of the GFCI outlet 12. For example, if the GFCI outlet 12 were to detect a fault and trip, the active cover plate 24 may remain on and functioning. The active cover plate 24 may have its own internal current-limiting safeguards. Conversely, if the active cover plate 24 were connected to the load terminals 16, it may act like any other circuit that is connected through the GFCI outlet 12 and have additional protection against ground faults.

In certain situations, there may be a large number of wires 14 packed behind a GFCI outlet 12. Because the body of a GFCI outlet 12 may be larger than the bodies of standard outlets, the wires 14 may be more tightly packed behind it. In some embodiments, the prongs 26 of the active cover plate 24 may have specific features that are designed to avoid contacting the wires 14 behind a GFCI outlet 12.

For example, the wires 14 may prevent the active cover plate 24 from installing because the prongs 26 jam into the wires 14. Additionally or alternatively, the prongs 26 may be lifted off the terminals 16 as they encounter wires 14. In certain embodiments, the setback distance 28 may change between various models of GFCI outlets 12 and may place additional compatibility requirements on prongs 26 that are designed for use with a wide range of GFCI outlets 12.

In selected embodiments, one or more prongs 26 may extend rearward (e.g., in a transverse direction) from a front plate 30 of an active cover plate 24. A front plate 30 may include a front surface 32 and a back surface 34. In some examples, a base 36 of one or more prongs 26 may be sandwiched between a back plate 38 of an active cover plate 24 and a front plate 30 thereof. A back plate 38 and/or front plate 30 may include a number of additional features, including respective posts 40 and apertures that can be used to secure the back plate 38 to the front plate 30 and/or to secure different prongs 26. In certain embodiments, a prong 26 may be secured in place when a base 36 thereof is fit over one or more of the posts 40 and sandwiched between the front plate 30 and the back plate 38.

In certain embodiments, a prong 26 may be connected to or abut against a back surface 34 of a front plate 30 at a location that is outboard of an outlet aperture 42 (i.e., outboard of an aperture 42 that is shaped and sized to surround or frame a face or front of an outlet such as a GFCI outlet 12) and extend rearward away from the back surface 34 of the front plate 30 in the transverse direction 11c. In selected embodiments, a prong 26 may include a base 36, an upright 44 extending rearward away from the base 36 in the transverse direction, and a resilient contact 46 located on an inboard side of the upright 44.

Prongs 26 may be lower on a front plate 30 (e.g., closer to an end of the front plate 30 or outlet aperture 42 formed in the front plate 30) when the resulting active cover plate 24 is configured to fit a GFCI outlet 12 rather than a standard outlet. This may be due to the fact that the terminals 16 on GFCI outlets 12 may be placed lower than on standard outlets. In selected embodiments, two opposing prongs 26a, 26b may contact either the load or the line terminals 16 of a GFCI outlet 12, depending on the configuration of the specific GFCI outlet 12 and installation orientation of the active cover plate 24 with respect to the GFCI outlet 12. As discussed above, if the prongs 26 contact the line terminals 16, an active cover plate 24 may draw electrical power from the wiring 14 and may operate regardless of whether the GFCI outlet 12 is in a tripped configuration or condition. Conversely, if the prongs 26 contact the load terminals 16, an active cover plate 24 may not receive any electrical power when the GFCI outlet 12 is in a tripped configuration or condition.

Prongs 26 may be generally straight and extend from the front plate 30 in a perpendicular manner from a front plate 30. However, this is only one example. The prongs 26 may have a variety of other configurations. For example, the prongs 26 may extend from the front plate 30 at any angle (e.g., an angle that is plus or minus some degrees from ninety degrees), including angles that bring the tips of the prongs 26 toward each other.

The remaining figures and associated text disclose an embodiment for a prong 26 of an active cover plate 24 that is configured to make contact with an electrical terminal 16. The disclosure below specifically refers to GFCI outlets 12 and the electrical terminal 16 corresponding thereto. However, the principles and structures disclosed are not limited to GFCI outlets 12 and may be used in any of a variety of active cover plate 24 configurations (e.g., may be used as part of active cover plates 24 configured to fit standard electrical outlets, electrical switches, or the like).

Referring to FIGS. 3-16, a base 36 of a prong 26 may include a number of features that assist in retaining the prong 26 as part of an active cover plate 24 (FIGS. 1 and 2) and to make an electrical connection with circuitry that is included as part of the active cover plate 24. For example, a base 36 may comprise one or more securement apertures 48. One or more posts 40 (FIG. 1) may pass through such apertures 48 in order to align and secure a base 36 of a prong 26 between a back surface 34 of a front plate 30 and a back plate 38. Alternatively or in addition thereto, a base 36 may comprise conductive material 50. The conductive material 50 may extend continuously from the base 36 to the upright 44 in order to electrically connect a resilient contact 46 to the electronic circuitry of an active cover plate 24 (FIGS. 1 and 2). Accordingly, conductive material 50 may comprise and extending continuously between a proximal portion 50a that form a base 36 or some part of a base 36 and a distal portion 50b that forms some part of an upright 44.

Wires may connect to the base 36 of a prong 26 (e.g., wires may be received and crimped, soldered, or otherwise secured within a wire-receiving structure 52 formed as part of a base 36 of a prong 26) and then extend to connect to a circuit board sandwiched between a front plate 30 and back plate 38. A circuit board may support or enable the activity associated with an active cover plate 24. Accordingly, if the activity associated with an active cover plate 24 is providing light, a circuit board may comprise one or more light sources such as LEDs or the like to provide light. Thus, electrical power tapped by a plurality of prongs 26 from an outlet (e.g., a GFCI outlet 12) may be used by a circuit board to emit light or perform some other desired activity.

In selected embodiments, a prong 26 may include a front element 54 that may serve as an insulator and/or cover on an inboard side of the prong 26 and back element 56 that may serve as an insulator and/or cover on an outboard side of the prong 26. In certain embodiments, an upright 44 may be a distal portion 50b without regard to whether any front or back elements 54, 56 are present. In other embodiments, an uprights 44 may comprise a distal portion 50b, a front element 54, and a back element 56.

The front and back elements 54, 56 may have a number of functions including insulation, structural support, and/or other functions. In certain embodiments, a resilient contact 46 may extend beyond a front element 54 to make contact with a terminal 16 when the corresponding active cover plate 24 is applied to a GFCI outlet 12.

In selected embodiments, a front element 54 may cover a bottom end 58 of a distal portion 50b of the conductive material 50. A bottom end 58 may have one or more securement apertures 60 extending therethrough. A front element 54 may include one or more posts 62 sized and shaped to extend through respective securement apertures 60 in the bottom end 58 and corresponding apertures in a back element 56. The posts 62 may be compressed or deformed (e.g., deformed by compression and/or melting) to secure the front and back elements 54, 56 in place on the distal portion 50b of the conductive material 50. The description given above is only one example. Posts could be on the back element 56 and apertures could be on the front element or other fastening techniques could be deployed.

In certain embodiments, a back element 56 may include a shoulder 64 that forms or defines a pocket or recess for receiving a distal portion 50b of the conductive material 50 and a front element 54. The shoulder 64 may ensure a proper alignment in a longitudinal direction 11a between a distal portion 50b of the conductive material 50, a front element 54, and a back element 56. In selected embodiments, a mechanical engagement or abutment 66 between front and back elements 54, 56 proximate a distal tip of a prong 26 may secure the front element 54 to the back element 56 in the lateral direction 11b. Thus, one or more posts 62, a shoulder 64, and/or a mechanical engagement or abutment 66 may secure a front element 54 to a back element 56 with a distal portion 50b of the conductive material 50 sandwiched therebetween. A variety of other or additional techniques could be used to connect the various elements/components.

Each prong 26 may include a resilient contact 46. In selected embodiments, a resilient contact 46 may be described as a resilient bowed contact. A resilient contact 46 may compress during insertion of a corresponding prongs 26 between the body of a GFCI outlet 12 and sides of an electrical receptacle box 22. This may enable a prong 26 to pass through very thin/narrow openings/gaps 20. Additionally, once the resilient contact 46 passes through the gap 20, it may expand or rebound into a recessed area containing the terminals 16.

In selected embodiments, a conductive material 50 may support a corresponding prong 26 and resiliently deflect when forces are applied to the prong 26. For example, the deflection of a prong 26 (e.g., of the conductive material 50 of the prong 26) in the lateral direction 11b may enable the prong 26 to flex outward when placed over a GFCI outlet 12 that is wider than spacing between the two opposing resilient contacts 46. The resiliency in the prong 26 (e.g., in the conductive material of the prong 26) may then urge the prong 26 inward so that the resilient contact 46 is brought into electrical and mechanical contact with a terminal 16 of the GFCI outlet 12.

A resilient contact 46 may be formed by permanently bending a strip of conductive material into a D-shape 68. The two opposing end portions 70, 72 of the strip may extend toward each other in the "stem" of the D-shape 68. In an installed configuration, a retainer portion 74 of a front element 54 may extend through the "counter" or enclosed space of the D-shape 68 and hold the stem of the D-shape 68 (i.e., the opposing end portions 70, 72) against an inboard surface of a distal portion 50b of the conductive material 50. This may ensure that the resilient contact 46 is always in electrical contact with the distal portion 50b.

Figure 8:
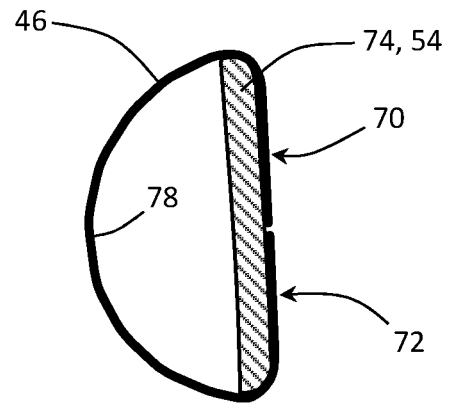
FIG. 8 is a side, cross-sectional view of a resilient contact and retainer, wherein the resilient contact is in an installed position.
Figure 9:
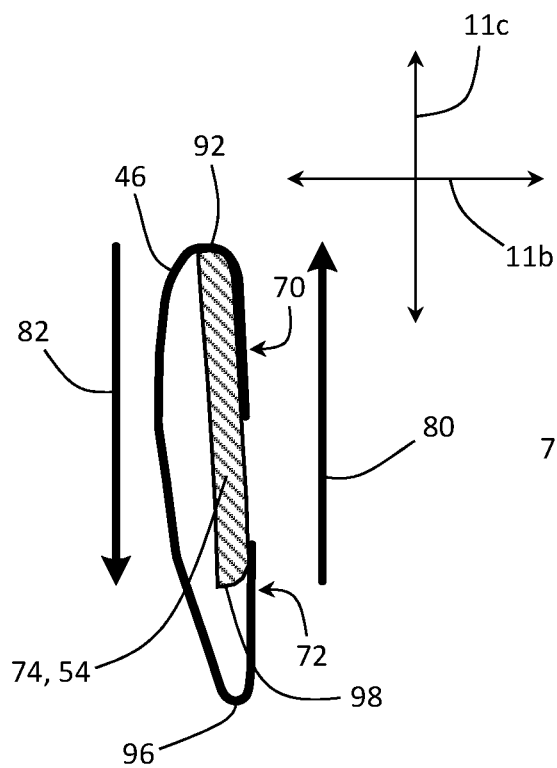
FIG. 9 is a side, cross-sectional view of a resilient contact and retainer, wherein the resilient contact is deflected or flattened to enable or support insertion of a prong.
Figure 10:
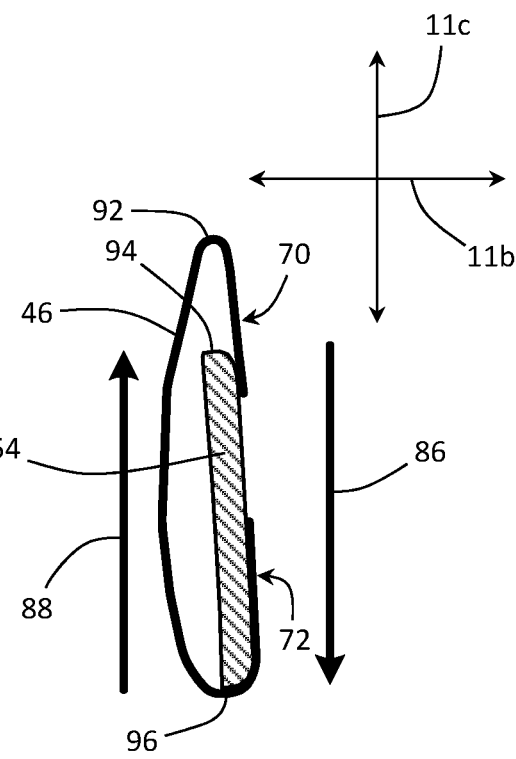
FIG. 10 is a side, cross-sectional view of a resilient contact and retainer, wherein the resilient contact is deflected or flattened to enable or support retraction of a prong.
Figures 11, 12:
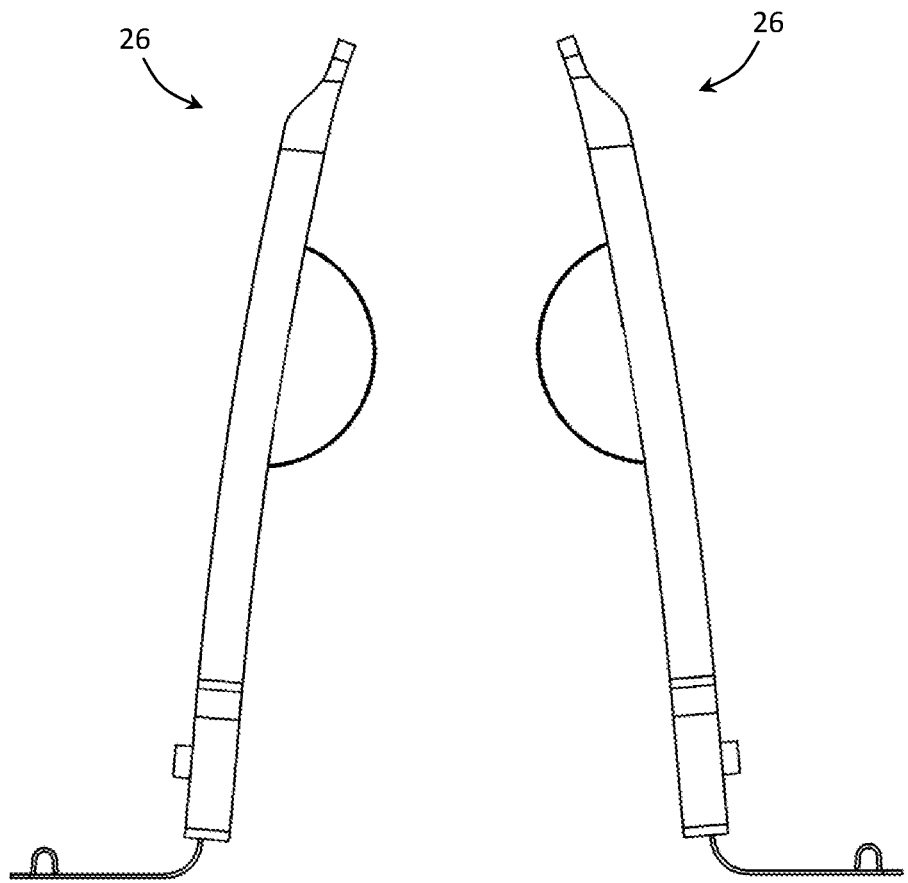
FIG. 11 is a first side view of the prong of FIG. 3.
FIG. 12 is a second, opposite side view of the prong of FIG. 3.
Figures 13, 14:
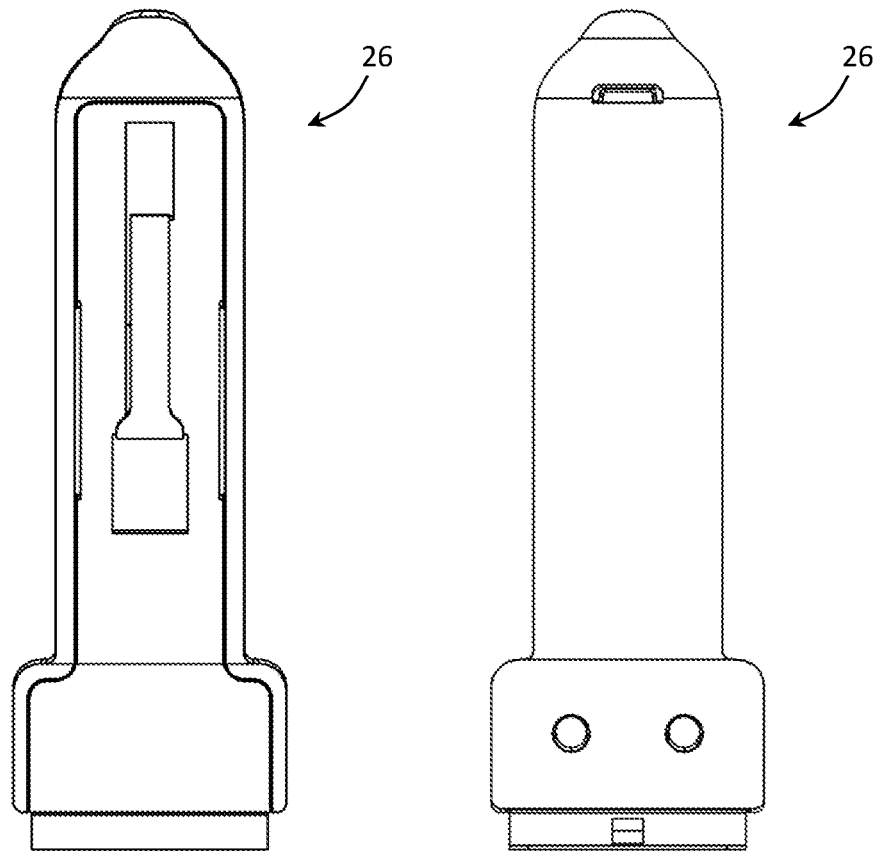
FIG. 13 is a front view of the prong of FIG. 3.
FIG. 14 is a back view of the prong of FIG. 3.
Figure 15:
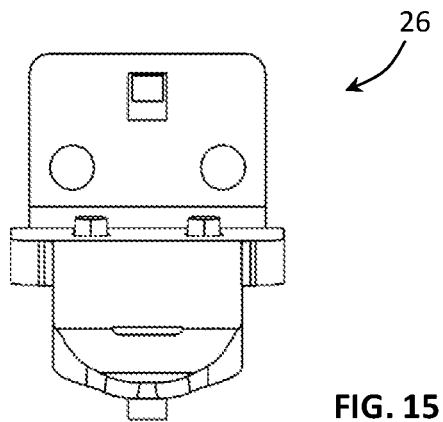
FIG. 15 is a top view of the prong of FIG. 3.
Figure 16:
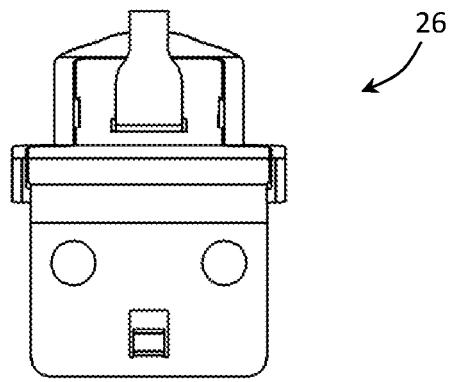
FIG. 16 is a bottom view of the prong of FIG. 3.

In selected embodiments, in a completely neutral or unloaded configuration (e.g., the configuration shown in FIG. 7) the opposing end portions 70, 72 may extend at respective angles 76. Accordingly, installation of the resilient contact 46 may result in the opposing end portions 70, 72 being pushed flat (i.e., as shown in FIG. 8). However, the resiliency of the opposing end portions 70, 72 and their bias toward returning to the respective angles 76 may ensure a continual electrical contact between the opposing end portions 70, 72 and the inboard surface of the distal portion 50b of the conductive material 50.

In an installed configuration, a resilient contact 46 may include a first end portion 70, second end portion 72, and middle portion 78. The first end portion 70 and second end portion 72 may contact a distal portion 50b of the conductive material 50, while the middle portion 78 may extend or bow inboard and away from the conductive material 50. Both end portions 70, 72, may be free to move with respect to the distal portion 50b in the transverse direction 11c.

As a force 80 urges a prong 26 into a gap 20 or the like, an opposing force 82 may resist that insertion force 80. If the insertion force 80 is sufficient, the opposing force 82 may overcome the bias of the resilient contact 46. That is, the opposing force 82 may flatten the resilient contact 46, thereby enabling the prong 26 to be inserted within the gap 20.

Flattening a resilient contact 46 may tend to push a middle portion 78 toward a distal portion 50b of the conductive material 50 and push first and second end portions 70, 72 away from one another. Accordingly, flattening a resilient contact 46 in a lateral direction 11b may cause elongation of the resilient contact 46 in the transverse direction 11c. To accommodate this elongation associated with insertion of a prong 26, a front element 54 may include a first aperture 84. A first aperture 84 may provide a void or space into which a resilient contact 46 may extend when the resilient contact 46 is being flattened in an insertion process.

As a force 86 pulls a prong 26 out of a gap 20 or the like, an opposing force 88 may resist that extraction force 86. If the extraction force 86 is sufficient, the opposing force 88 may overcome the bias of the resilient contact 46. That is, the opposing force 88 may flatten the resilient contact 46, thereby enabling the prong 26 to be extracted from within the gap 20. As noted above, flattening a resilient contact 46 in a lateral direction 11b may cause elongation of the resilient contact 46 in the transverse direction 11c. To accommodate the elongation associated with extracting a prong 26, a front element 54 may include a second aperture 90. A second aperture 90 may provide a void or space into which a resilient contact 46 may extend when the resilient contact 46 is being flattened in an extraction process.

In general, a resilient contact 46 may not simultaneously deflect or elongate into both the first and second apertures 84, 90. Rather, when a prong 26 is inserted into a gap 20, the opposing force 82 may urge a distal portion 92 of the resilient contact 46 into abutment against a distal edge 94 of a retainer portion 74 and urge a proximal portion 96 of the resilient contact 46 into the void created by the first aperture 84. Similarly, when a prong 26 is extracted from within a gap 20, the opposing force 88 may urge a proximal portion 96 of the resilient contact 46 into abutment against a proximal edge 98 of a retainer portion 74 and urge a distal portion 92 of the resilient contact 46 into the void created by the second aperture 90. Accordingly, a prong 26 and a resilient contact 46 corresponding thereto may be equally well adapted to insertion and extraction without damaging (e.g., crimpling or permanently bending) the resilient contact 46.

In selected embodiments, a resilient contact 46 may resiliently compress under a normal or force of less than 10 newtons to less than one quarter of its uncompressed height. Additionally or alternatively, a resilient contact 46 may be configured to resiliently compress to less than half of its uncompressed height. For example, a resilient contact 46 may be configured to be compressed to less than half of its uncompressed height under manual pressure during installation of the active cover plate 24 over an GFCI outlet 12. In certain embodiments, a resilient contact 46 may be configured to resiliently rebound to at least 80% of its original height after being compress to half of its uncompressed height. A GFCI outlet may be shown as an example. Principles could be applied to a wide range of receptacles and electrical configurations.

The examples discussed above are only illustrative. The principles described may take a variety of different forms and be combined with other principles or features described herein. For example, the prongs 26, conductive material 50, resilient contact 46, retainer portion 74, and/or the like shown in FIGS. 3-16 may have different sizes, shapes, and/or proportions. Thus, prongs 26 are not limited to any specific embodiment shown, but may accommodate a wide range of implementations of the principles described herein.

The preceding description has been presented only to illustrate and describe examples of the principles and features described. This description is not intended to be exhaustive or to limit these principles to any precise form disclosed. Many modifications and variations are possible in light of the above teaching.

What is claimed is:

1. An active cover plate extending in a longitudinal direction, a lateral direction, and a transverse direction that are orthogonal to one another, the active cover plate comprising:
   a front plate comprising a front surface, a back surface, and an outlet aperture, wherein the outlet aperture extends through the front plate in the transverse direction;
   a prong connecting to the back surface of the front plate at a location outboard of the outlet aperture;
   the prong extending rearward away from the back surface of the front plate in the transverse direction;
   the prong comprising:
      an upright extending rearward away from the back surface of the front plate in the transverse direction,
      a front element covering at least a portion of an inboard side of the upright,
      a resilient contact located on the inboard side of the upright, and
      the resilient contact comprising a first end, second end, and middle portion; and
   the prong wherein the first end and the second end each contact the upright, the middle portion extends away from the upright, and the front element is formed of an electrically insulative material.

2. The active cover plate of claim 1, wherein both the first and second ends of the resilient contact are free to move in the transverse direction with respect to the upright.

3. The active cover plate of claim 1, wherein the resilient contact comprises a strip of electrically conductive material bent into a D-shape, wherein the first and second ends extend toward each other in a stem portion of the D-shape.

4. The active cover plate of claim 3, wherein the upright is formed of an electrically conductive material.

5. The active cover plate of claim 4, wherein the first and second ends are captured between the front element and the inboard side of the upright such that the first and second ends each have a greater freedom of motion in the transverse direction than in the lateral direction or the longitudinal direction.

6. The active cover plate of claim 5, wherein the resilient contact resiliently flattens in response to a force urging the middle portion in the lateral direction toward the inboard side of the upright.

7. The active cover plate of claim 6, further comprising electronic circuitry connected to the front plate, and electrically conductive material extending to connect the upright to the electronic circuitry.

8. An active cover plate extending in a longitudinal direction, a lateral direction, and a transverse direction that are orthogonal to one another, the active cover plate comprising:

a front plate comprising a front surface, a back surface, and an outlet aperture, wherein the outlet aperture extends through the front plate in the transverse direction;
a first prong connecting to the back surface of the front plate at a location outboard of the outlet aperture;
the first prong extending rearward away from the back surface of the front plate in the transverse direction; and
the first prong comprising:
a first upright formed of electrically conductive material and extending rearward away from the back surface of the front plate in the transverse direction,
a first resilient contact located on and contacting an inboard side of the first upright, and
the first resilient contact comprising a strip having a first end, second end, and middle portion, the strip being formed of electrically conductive material that is bent into a D-shape wherein the first end and the second end extend toward each other in a stem portion of the D-shape.

9. The active cover plate of claim 8, wherein both the first and second ends are free to move in the transverse direction with respect to the first upright.

10. The active cover plate of claim 9, wherein the first prong further comprises a front element covering at least a portion of the inboard side of the first upright.

11. The active cover plate of claim 10, wherein the first and second ends of the first resilient contact are captured between the front element and the inboard side of the first upright such that the first and second ends of the first resilient contact each have a greater freedom of motion in the transverse direction than in the lateral direction or the longitudinal direction.

12. The active cover plate of claim 8, further comprising a second prong connecting to the back surface of the front plate at a location outboard of the outlet aperture, the second prong being opposite the first prong across the outlet aperture.

13. The active cover plate of claim 12, wherein the second prong extends rearward away from the back surface of the front plate in the transverse direction.

14. The active cover plate of claim 13, wherein the second prong comprises:
a second upright extending rearward away from the back surface of the front plate in the transverse direction; and
a second resilient contact located on an inboard side of the second upright.

15. A method comprising:
obtaining an active cover plate comprising
a front plate comprising an outlet aperture extending therethrough,
a prong connecting to a back surface of the front plate at a location outboard of the outlet aperture,
the prong extending rearward away from the back surface of the front plate, and the prong comprising
(1) an upright formed of electrically conductive material and extending rearward away from the back surface of the front plate, (2) a resilient contact located on and contacting an inboard side of the upright, and (3) the resilient contact comprising a strip having a first end, a second end, and a middle portion, the strip being formed of electrically conductive material that is bent into a D-shape wherein the first end and the second end extend toward each other in a stem portion of the D-shape;
inserting the prong into a gap between a side of an electrical receptacle and a wall of an electrical box in which the electrical receptacle is installed;
contacting, by the prong during the inserting, the side and the wall simultaneously;
deflecting, by the prong as a result of the contacting, to a reduced width;
rebounding, by the prong after the inserting, to a second width greater than the reduced width; and
touching, by the prong after the rebounding, an electrical terminal located on the side of the electrical receptacle.

16. An active cover plate extending in longitudinal, lateral, and transverse directions that are orthogonal to one another, the active cover plate comprising:
a front plate comprising a front surface, a back surface, and an outlet aperture, wherein the outlet aperture extends through the front plate in the transverse direction;
a prong connecting to the back surface of the front plate at a location outboard of the outlet aperture;
the prong extending rearward away from the back surface of the front plate in the transverse direction; and
the prong comprising:
an upright extending rearward away from the back surface of the front plate in the transverse direction, and
a contact located on an inboard side of the upright, wherein the contact is configured to slide in a transverse direction with respect to the upright.

17. The active cover plate of claim 16, wherein the contact comprises a resilient contact configured to compress in a gap between a GFCI outlet and an electrical box.

18. The active cover plate of claim 16, wherein the prong further comprises a first insulating element on the inboard side of the upright and the contact comprises a first end portion and a second end portion sandwiched between the first insulating element and the upright.

19. The active cover plate of claim 16, wherein the contact is configured to maintain electrical contact between the upright as the contact slides along the upright.

20. The active cover plate of claim 16, wherein the contact comprises a strip having a first end, second end, and middle portion, the strip being formed of electrically conductive material that is bent into a D-shape wherein the first and second ends extend toward each other in a stem portion of the D-shape.

* * * * *